C. C. BRADLEY.
HORSE HAY-RAKE.
No. 190,410. Patented May 8, 1877.
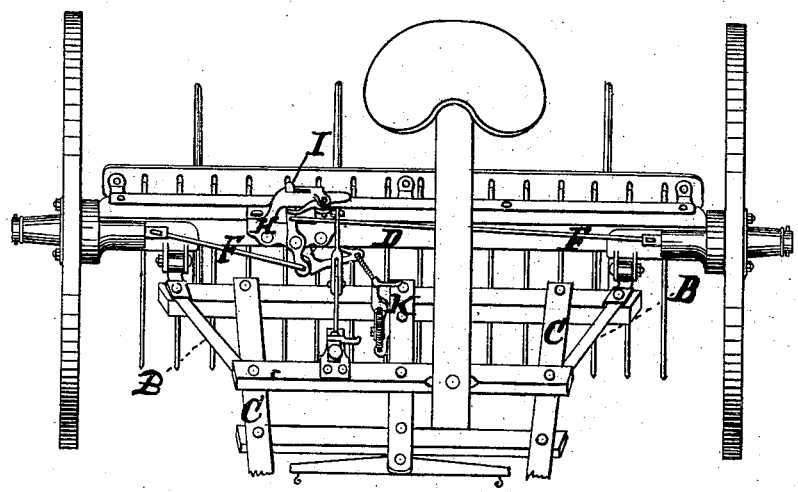
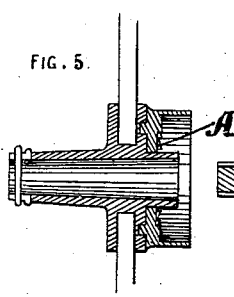
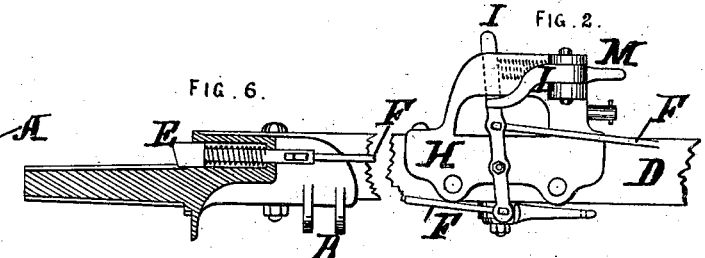
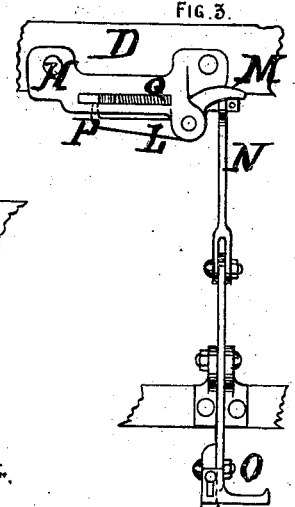
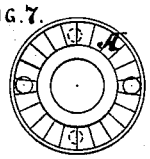
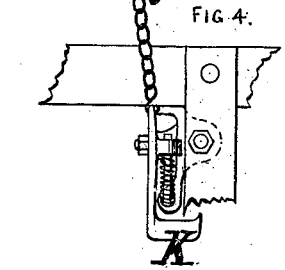
Witnesses:
J. Bonsall Taylor.
Owen Darcy
Inventor.
Christopher C. Bradley
by atty.
W. C. Strawbridge.

UNITED STATES PATENT OFFICE.

CHRISTOPHER C. BRADLEY, OF SYRACUSE, NEW YORK.

IMPROVEMENT IN HORSE HAY-RAKES.

Specification forming part of Letters Patent No. 190,410, dated May 8, 1877; application filed March 18, 1876.

*To all whom it may concern:*

Be it known that I, CHRISTOPHER C. BRADLEY, of Syracuse, in the county of Onondaga, and State of New York, have invented certain new and useful Improvements upon the Horse Hay-Rake for which Letters Patent of the United States were granted to me upon the 14th day of July, A. D. 1874, in connection with which Letters Patent the following, which I declare to be a full, clear, and precise description of my improvement, is to be understood.

Similar letters of reference denote like parts in all the drawings, of which—

Figure 1 is a front elevation of my improved rake the shafts resting upon the ground. Fig. 2 is a detailed front elevation of the yoke and attachments; Fig. 3, a top view of the yoke, hook-catch, and releasing connecting-link; Fig. 4, a top view of the depressing foot-lever and crank G, the rake-head being removed. Fig. 5 is a section of hub and ratchet-plate; Fig. 6, a section of the spindle and front view of the connecting-braces; Fig. 7, an inside view of the ratchet-plate, showing the bolts.

My invention relates to lifting and dropping horse hay-rakes, and has for its object the improvement and modification, in detailed construction and method of operation, of my former horse-rake hereinbefore recited.

It consists of lateral braces B B, extending from a point in the shaft between the axle and the whiffletree to a point on the axle in close proximity to the wheel, whereby a more perfect rigidity is given to the thill framework, and the axle is stayed and prevented from being bent or strained in case the wheel should come in violent contact with a stone or other obstacle.

The braces B B not only act as braces proper to the thill frame-work, but form the connecting element between the thill framework and the axle, and are hingedly connected with said axle, so as to allow of the necessary revolution of the same when the machine is in operation.

The combination of the foot-lever K, chain J, crank G, yoke H, spring-lever I, and hook-catch L, to throw the dogs in bite with the ratchets.

The combination of yoke H, hook-catch L, spring Q, and connecting-link N, to throw the dogs out of bite with the ratchet.

The combination of the ratchet hub-plates A, sliding dogs E, connecting-rods F, spring-lever I, yoke H, crank G, chain J, foot-lever K, hook-catch L, spring Q, and link N, the whole forming a foot-operating automatically-releasing mechanism for lifting and dropping the teeth of a horse hay-rake.

The construction of my lifting and dropping device, wherein this improvement largely consists, is as follows: The sliding dogs E, connecting-rods F, and spring-lever I are substantially identical in construction with the same parts in my patent.

The yoke H is slightly modified in form. When raking, the spring-lever I is kept in the position shown in Figs. 1 and 2. Beneath the rake-head D, and pivoted to it, is a crank, G, bearing against the lower end of the lever I, (shown in Fig. 4,) and connected by a chain, J, to a depressing spring foot-lever, K. In the upper part of the yoke is a spring hook-catch, L, a top view of which is shown in Fig. 3. It is provided with a prong-piece M, which comes immediately in line over the connecting-link N of a tilting foot-lever, O. Its hook P, when the teeth are down, rests on the front of the upper end of the lever I, and bears strongly against it by the action of the spring Q acting out against the prong M.

Such being its construction, my device is operated in the following manner to lift the rakes: The foot-lever K is depressed, drawing with it the crank G, which throws the lower end of the lever I to the left, whereby the dogs are thrown into bite with the ratchets, and whereby also the hook-catch L is caused to catch and retain the upper end of the lever I, as shown in Fig. 3, in which position the device is set. A forward motion of the rake will now lift the teeth and carry the head D and yoke H forward and around until the prong M of the catch I encounters, with considerable force, in its downward course, the link N, whereby the spring Q, which also acts as a buffer to the blow, is compressed and the hook P of the catch L released from the lever I, whereupon the spring Q recoils and throws the dogs out of bite with the ratchets when the rakes fall by their gravity. A second depression of the foot-lever repeats the action.

What I claim, and desire to secure by Letters Patent of the United States, is—

1. In a lifting and dropping horse hay-rake the combination of the foot-lever K, chain J, crank G, yoke H, spring-lever I, and hook-catch L, to throw the dogs in bite with the ratchets, substantially as described.

2. In a lifting and dropping horse hay-rake the combination of yoke H, hook-catch L, spring Q, and connecting-link N, to throw the dogs out of bite with the ratchet, substantially as described.

3. The combination of the ratchet hub-plates A, sliding dogs E, connecting-rods F, spring-lever I, yoke H, crank G, chain J, foot-lever K, hook-catch L, spring Q, and link N, the whole forming a foot-operating automatically-releasing mechanism for lifting and dropping the teeth of a horse hay-rake, substantially as described.

4. In a horse hay-rake braces B B extending from a point on the shaft between the oscillating axle and whiffletree to a point on the axle in close proximity to the wheel, and bearing in hinges which connect the draft-frame with the axle, to stay the axle and thill framework, substantially as shown and described.

CHRISTOPHER C. BRADLEY.

Witnesses:
E. H. WILDER,
C. S. BUNNELL.